UNITED STATES PATENT OFFICE.

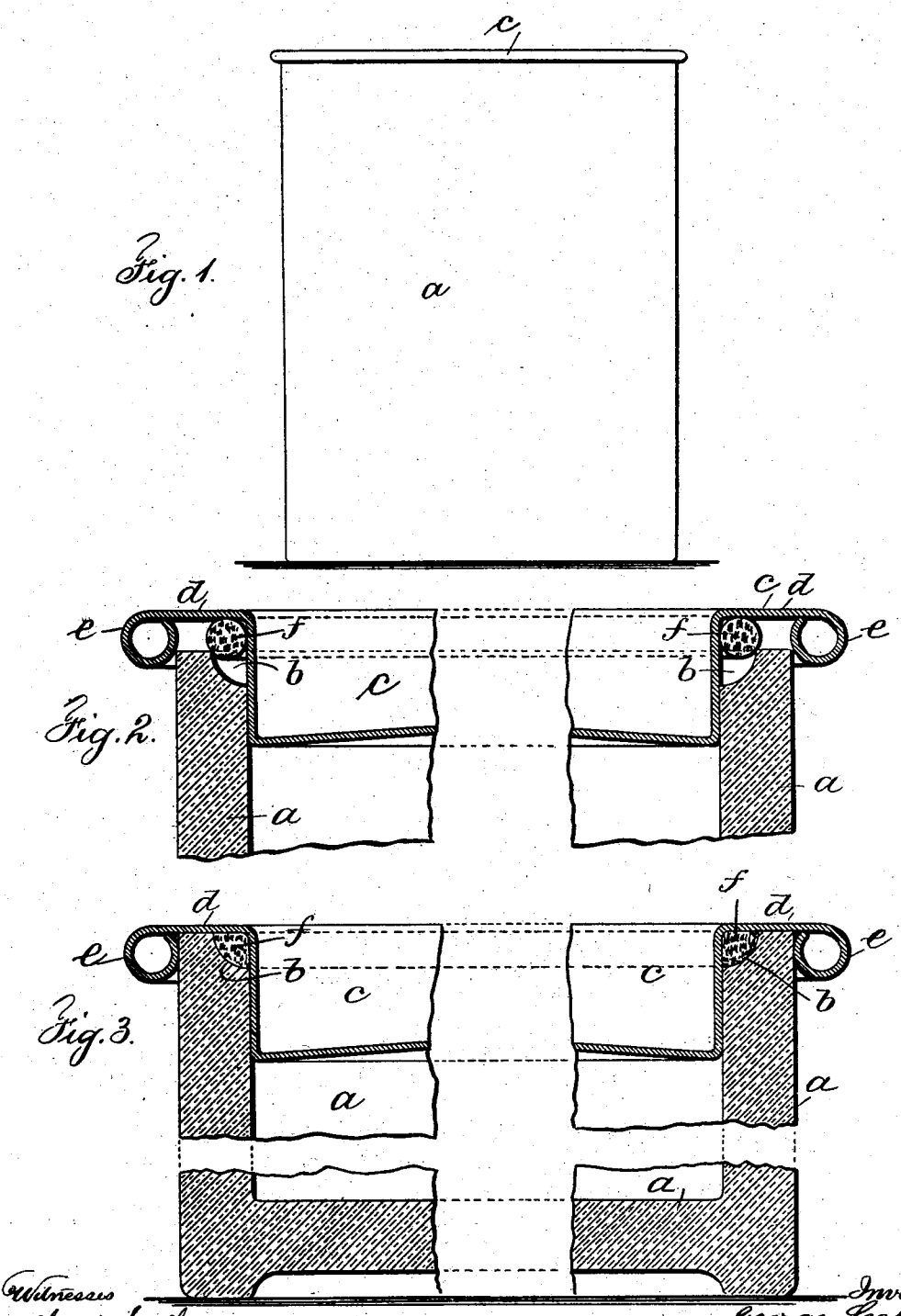

GEORGE LEES, OF CHICAGO, ILLINOIS, ASSIGNOR TO HIMSELF, AND CHARLES C. HOVEY, OF BAINBRIDGE, NEW YORK.

SEALING-JAR FOR PRESERVING ARTICLES OF FOOD.

SPECIFICATION forming part of Letters Patent No. 718,643, dated January 20, 1903.

Application filed April 14, 1902. Serial No. 102,731. (No model.)

*To all whom it may concern:*

Be it known that I, GEORGE LEES, a citizen of the United States, residing at Chicago, in the county of Cook and State of Illinois, have invented an Improvement in Sealing-Jars for Preserving Articles of Food, of which the following is a specification.

My invention relates to a sealing jar or vessel adapted to receive various articles of food and in which such articles of food are preserved by exhausting the air and effecting the seal by atmospheric pressure. Devices of this character have heretofore been employed, the same being of sheet metal; but it is well known that sheet-metal receptacles or cans are liable to corrosive action by certain chemicals or juices contained in the articles of food, and frequently these articles of food are poisoned on account of contact with the sheet-metal body of the receptacle; but this criticism is not material so far as the cover of the receptacle is concerned, as the articles of food do not usually come in contact for any length of time with the cover.

In my present invention I employ a sheet-metal cover with a gasket; but the body of the receptacle or vessel is of glass, porcelain, or other similar vitrified material. The body is provided with suitable walls, a flat top, and with a recess at the upper edge on the inner side. The cover fits down appreciably into the body, so that the walls of the cover and the inner surface wall of the body are substantially in contact, and the gasket of the cover fits into the recess provided in the inner top edge of the body, the flange of the cover lying upon the upper edge of the body and said cover having a circular downturned rib at the extreme edge overhanging and extending outside of the outer upper edge of the body, so as to substantially completely inclose the upper edge of the body and form an airtight closure to the same.

In the drawings, Figure 1 is an elevation illustrating my improvement. Fig. 2 is a partial vertical section of the body and cover with the gasket, the same simply resting upon the body; and Fig. 3 is a partial vertical section with the parts in the position occupied thereby when under pressure. Figs. 2 and 3 are shown of exaggerated size over Fig. 1 for clearness.

The body $a$ of the vessel or receptacle is of glass, porcelain, or other similar vitrified material. It is shown as having straight walls and a flat top surface, with the inner top edge, or, in other words, the upper edge on the inner side, formed with a recess $b$, which may be concave, as shown, or may have any other surface configuration desired. The cover $c$ is advantageously of sheet metal. It is preferably made with a depressed center, having straight walls and a convex central surface. From the straight walls outward there is a flat flange $d$ to the cover, which terminates circumferentially in a circular downturned rib $e$ at the extreme edge. A gasket $f$, of rubber, fits around the cover beneath the flange $d$, bearing against and into the angle formed by the outer surface of the straight walls of the cover and the under surface of the flange $d$, and this gasket is preferably in diameter slightly greater than the width of the recess $b$. The annular space between the outer surface of the straight walls of the cover and the inner surface of the circular downturned rib $e$ agrees with the thickness of the body $a$ of the receptacle or vessel, and when the cover is forced down into position under atmospheric pressure, as shown in Fig. 3, the walls of the cover lie within and against the walls of the body, and the flange of the cover lies on top of the body-walls, and the rib $e$ comes against the surface of the outer wall, so that the upper edge or periphery of the body or vessel is substantially inclosed within said parts of the cover, and when in this position the gasket completely fills the recess $b$ and the surface thereof is in forcible contact with the surface of the body and the under surface of the cover at right angles to one another, thereby forming a perfect seal maintained by external atmospheric pressure. In this manner the vessel or receptacle containing the food is completely and effectually sealed for the preservation of the contents. I have shown and prefer to convex the center of the cover, as the atmospheric pressure when in use has a tendency to flatten the same, the effect of which is to cause the straight walls of the cover to more closely contact with and hug the inner surface of the body $a$, because were the central part flat or concave the pressure would have a tendency to draw the straight walls of the cover away from contact with the inner surface of the body.

The devices that may be in evidence for exhausting the air from the vessel or receptacle so as to apply atmospheric pressure thereto for the sealing of the same form no part of my present invention.

This vessel or receptacle is cheaply made, is very efficient in use, and can be used repeatedly without injury. It can be effectually and repeatedly cleansed and does not contaminate the food contents.

I claim as my invention—

1. The combination with a sheet-metal cover having a depressed center and suitable walls, a flat flange bent outward therefrom, a circular rib at the edge and a rubber gasket, of a body of glass, porcelain or other similar vitrified material having suitable walls, a flat top surface and a recess at the upper edge on the inner side adapted to receive the gasket of the cover, the flat top surface, the recess and the rubber gasket being received against the flat flange and between the circular rib and the depressed center of the cover, substantially as set forth.

2. The combination with a body of glass, porcelain, or other similar vitrified material having suitable walls, a flat top surface and a recess at the inner upper edge, of a sheet-metal cover having a depressed center, suitable walls, a flat flange bent outward therefrom, and a circular downturned rib at the extreme edge, and a gasket of rubber or similar material of slightly greater diameter than the width of the aforesaid recess, the said walls of the cover fitting snugly within and coinciding with the walls of the said body, and the body being received within the annular space between the outer surface of the straight walls of the cover and the inner surface of the circular downturned rib, substantially as set forth.

3. The combination with a body of glass, porcelain or other similar vitrified material having straight walls, a flat top surface and a recess at the inner top edge, of a cover with a depressed center having straight walls whose extreme diameter substantially agrees with the inner diameter of the body and having a convex center, a flat flange bent outward therefrom, and a circular downturned rib at the extreme edge, and a gasket of suitable elastic material adapted to fit said recess, the straight walls of the cover fitting appreciably down into the body and the body being received within the annular space between the outer surface of the straight walls of the cover and the inner surface of the circular downturned rib, so that said rib overhangs the body and the gasket fits the recess in the upper edge of the body, substantially as set forth.

Signed by me this 9th day of April, 1902.

GEO. LEES.

Witnesses:
    FRED LOOMIS,
    S. RUPRIGHT.